(12) United States Patent
Tertinek

(10) Patent No.: US 11,915,537 B2
(45) Date of Patent: Feb. 27, 2024

(54) ENTRY SYSTEM AND METHOD OF OPERATING THE SAME

(71) Applicant: NXP B.V., Eindhoven (NL)

(72) Inventor: Stefan Tertinek, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/651,826

(22) Filed: Feb. 21, 2022

(65) Prior Publication Data

US 2022/0301371 A1   Sep. 22, 2022

(30) Foreign Application Priority Data

Mar. 17, 2021   (EP) .................................. 21163276

(51) Int. Cl.
| | | |
|---|---|---|
| G07C 9/00 | (2020.01) | |
| H04W 12/63 | (2021.01) | |
| H04W 12/06 | (2021.01) | |
| H04W 52/02 | (2009.01) | |

(52) U.S. Cl.
CPC ........ *G07C 9/00309* (2013.01); *H04W 12/06* (2013.01); *H04W 12/63* (2021.01); *H04W 52/0229* (2013.01); *G07C 2009/00793* (2013.01); *G07C 2009/00984* (2013.01); *G07C 2209/63* (2013.01)

(58) Field of Classification Search
CPC ..... G07C 9/00309; G07C 2009/00984; H04W 12/06; H04W 12/63; G01S 5/0284; G01S 5/145
See application file for complete search history.

(56) References Cited

U.S. PATENT DOCUMENTS

| | | | |
|---|---|---|---|
| 10,246,009 B2 | 4/2019 | McMahon et al. | |
| 10,328,900 B1 | 6/2019 | Yakovenko et al. | |
| 2005/0083174 A1* | 4/2005 | Nakamura | E05B 81/78 340/5.72 |
| 2014/0330449 A1 | 11/2014 | Oman et al. | |
| 2019/0066422 A1* | 2/2019 | Breer | H04W 4/20 |
| 2019/0162010 A1 | 5/2019 | Rafrafi et al. | |
| 2020/0200862 A1* | 6/2020 | Li | G01S 13/74 |
| 2021/0173064 A1* | 6/2021 | Yoon | H04B 1/7163 |
| 2022/0001836 A1* | 1/2022 | Baek | G01S 5/0205 |
| 2022/0286809 A1* | 9/2022 | Hasegawa | H04W 76/15 |

OTHER PUBLICATIONS

Aurelien, F., "Relay Attacks on Passive Keyless Entry and Start Systems in Modern Cars", International Association for Cryptologic Research, vol. 20101021:205436, pp. 1-15, Oct. 21, 2010.

(Continued)

*Primary Examiner* — Vernal U Brown

(57) ABSTRACT

An entry system is provided that includes a radio frequency (RF) communication unit configured to transmit a wake-up signal to an external authentication device, one or more ultra-wideband (UWB) communication nodes configured to operate in a radar mode, wherein the nodes are configured to receive one or more radar signals reflected by an external object when operating in the radar mode, and a processing unit configured to cause the RF communication unit to transmit the wake-up signal if the UWB communication nodes receive the radar signals.

17 Claims, 3 Drawing Sheets

(56) References Cited

OTHER PUBLICATIONS

Hakansson, D., "Driver Intention 1-4,9-15 Prediction for Optimal Vehicle Wake-up a target tracking approach for driver intention prediction using UWB radar technology", Master's Thesis in Systems, Control and Mechatronics, Department of Electrical Engineering, Chalmers University of Technology, Jun. 15, 2020.

Kamouaa, J., "Turn-Key Passive Entry/ 1-15 Passive Start Solution", Automotive Compilation vol. 10, Sep. 9, 2013.

* cited by examiner

ENTRY SYSTEM AND METHOD OF OPERATING THE SAME

CROSS-REFERENCE TO RELATED APPLICATIONS

This application claims the priority under 35 U.S.C. § 119 of European Patent application no. 21163276.5, filed on 17 Mar. 2021, the contents of which are incorporated by reference herein.

TECHNICAL FIELD

The present disclosure relates to an entry system. Furthermore, the present disclosure relates to a corresponding method of operating an entry system, and to a corresponding computer program.

BACKGROUND

Entry systems are systems that facilitate access to a given object, for example a vehicle. For example, an entry system may be integrated into a vehicle, to enable unlocking the vehicle and to perform other predefined actions on the vehicle after a successful authentication of a user. For this purpose, the entry system may communicate with an authentication device carried by the user. For instance, the authentication device may be a key fob, or another authentication token carried by the user. When the user approaches the vehicle, the entry system performs an authentication process with the authentication device, and after a successful authentication the vehicle may be unlocked and/or other predefined actions may be performed. In addition, to prevent so-called relay attacks on the vehicle, ultra-wideband (UWB) based ranging operations may be performed between the entry system and the authentication device, in order to determine the distance between the two devices. In that case, access to the vehicle may be granted conditionally, for instance only if the determined distance is smaller than a predefined threshold. A UWB-based entry system typically comprises a plurality of UWB communication nodes (i.e., "UWB nodes" or "UWB anchors" in short) by means of which the ranging operations with the UWB-enabled authentication device are performed. However, a UWB-based entry system may consume a relatively large amount of power. Thus, it may be desirable to reduce the power consumption of an entry system of the kind set forth.

SUMMARY

In accordance with a first aspect of the present disclosure, an entry system is provided, comprising: a radio frequency (RF) communication unit configured to transmit a wake-up signal to an external authentication device, one or more ultra-wideband (UWB) communication nodes configured to operate in a radar mode, wherein the nodes are configured to receive one or more radar signals reflected by an external object when operating in the radar mode, and a processing unit configured to cause the RF communication unit to transmit the wake-up signal if the UWB communication nodes receive the radar signals.

In one or more embodiments, the wake-up signal is a broadcasted polling signal.

In one or more embodiments, the processing unit is configured to prevent that the RF communication unit transmits the wake-up signal if the UWB communication nodes do not receive the radar signals.

In one or more embodiments, the processing unit is configured to carry out, after the authentication device has woken up, an authentication process with the authentication device through the RF communication unit or through a further communication unit comprised in the system.

In one or more embodiments, the UWB communication nodes are further configured to operate in a ranging mode, and the processing unit is configured to carry out, before a successful authentication of the authentication device, one or more ranging operations with the authentication device through the UWB communication nodes.

In one or more embodiments, the UWB communication nodes are further configured to operate in a ranging mode, and the processing unit is configured to carry out, after a successful authentication of the authentication device, one or more ranging operations with the authentication device through the UWB communication nodes.

In one or more embodiments, the processing unit is configured to exchange, before carrying out the ranging operations, ranging configuration data with the authentication device through the RF communication unit or through a further communication unit comprised in the system.

In one or more embodiments, the processing unit is further configured to perform a predefined action if the ranging operations output a distance which is smaller than a predefined threshold.

In one or more embodiments, the RF communication unit is a low frequency (LF) communication unit.

In one or more embodiments, the system comprises a further communication unit, and the processing unit is configured to receive ranging configuration data through the further communication unit before the wake-up signal is transmitted to the authentication device.

In one or more embodiments, the further communication unit is a Bluetooth low energy (BLE) communication unit.

In one or more embodiments, the system further comprises a plurality of antennas coupled to the RF communication unit, and the processing unit is configured to determine respective distances between the external object and the antennas based on the radar signals, and to select a suitable antenna for transmitting the wake-up signal based on the determined distances.

In one or more embodiments, the processing unit is configured to select the antenna having the smallest distance to the external object.

In accordance with a second aspect of the present disclosure, a method of operating an entry system is conceived, comprising: operating one or more ultra-wideband (UWB) communication nodes in a radar mode, and causing, by a processing unit, a radio frequency (RF) communication unit to transmit a wake-up signal to an external authentication device if the UWB communication nodes receive one or more radar signals reflected by an external object.

In accordance with a third aspect of the present disclosure, a computer program is provided, comprising executable instructions that, when executed by an entry system, cause the entry system to carry out a method of the kind set forth.

DESCRIPTION OF DRAWINGS

Embodiments will be described in more detail with reference to the appended drawings, in which.

DESCRIPTION OF EMBODIMENTS

Figure 1:
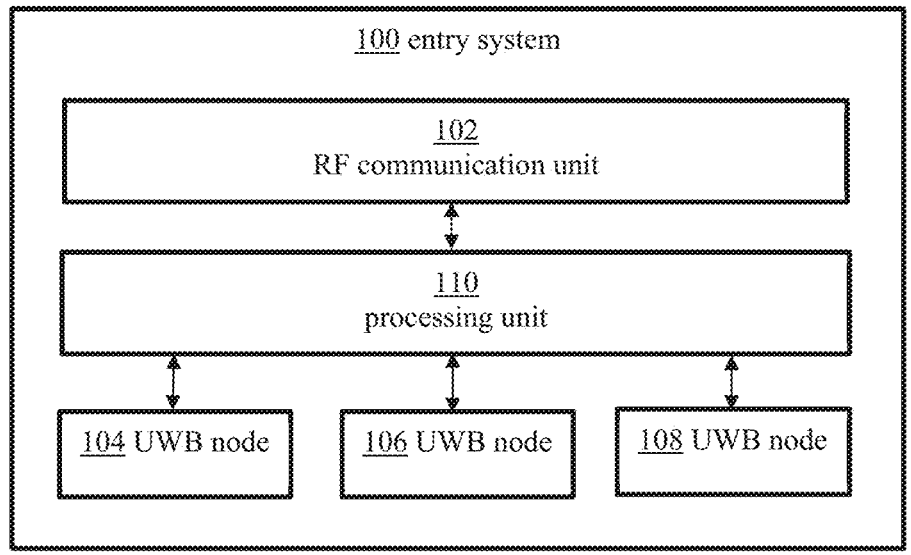
FIG. 1 shows an illustrative embodiment of an entry system.

As mentioned above, entry systems are systems that facilitate access to a given object, for example a vehicle. For example, an entry system may be integrated into a vehicle, to enable unlocking the vehicle and to perform other pre-defined actions on the vehicle after a successful authentication of a user. For this purpose, the entry system may communicate with an authentication device carried by the user. For instance, the authentication device may be a key fob or another authentication token carried by the user. When the user approaches the vehicle, the entry system performs an authentication process with the authentication device, and after a successful authentication the vehicle may be unlocked and/or other predefined actions may be performed. In addition, to prevent so-called relay attacks on the vehicle, ultra-wideband (UWB) based ranging operations may be performed between the entry system and the authentication device, in order to determine the distance between the two devices. In that case, access to the vehicle may be granted conditionally, for instance only if the determined distance is smaller than a predefined threshold. A UWB-based entry system typically comprises a plurality of UWB communication nodes (i.e., "UWB nodes" or "UWB anchors" in short) by means of which the ranging operations with the UWB-enabled authentication device are performed. However, a UWB-based entry system may consume a relatively large amount of power. Thus, it may be desirable to reduce the power consumption of an entry system of the kind set forth.

In particular, UWB is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. UWB technology—also referred to as impulse-radio ultra-wideband (IR-UWB)—is a RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method. Because UWB technology has an accurate distance measurement capability, it may be used to advantage in entry systems in which the position of devices should be determined to enable access to an object. It is noted that the term "entry system" as used herein may be interpreted broadly, in the sense that it does not merely refer to a system that provides or enables physical access to an object. For instance, it may also refer to a system that grants permission or otherwise enables to carry out a function which the object can perform or to execute an application which can be run by a processor comprised in said object.

An example of an entry system of the kind set forth is a so-called passive keyless entry (PKE) system. PKE systems often have increased power consumption, because a vehicle may continuously broadcast a low frequency (LF) polling signal to wake up a key fob in its proximity, with the fob continuously reporting back signal strength information via a wireless link. In PKE systems, a vehicle user can automatically lock and unlock a vehicle without actively using a key fob. For example, a door may be unlocked, and a welcome light may be turned on when the user is in the vehicle's close proximity. More specifically, the door may be unlocked only if the user is within a so-called Thatcham zone, which has been defined by the Motor Insurance Repair Research Centre (MIRRC). The Thatcham zone is defined as an operating range around a vehicle, which does not exceed 2 meters from any point around the perimeter of the vehicle. In some of the existing PKE systems the vehicle continuously broadcasts a polling signal via an LF field to wake up any key fob that may be in the proximity. After the fob has woken up, it measures the signal strength of the received LF field (RSSI), and reports the RSSI back to the vehicle via a wireless link (e.g. an ultra-high frequency, UHF link). To prevent a relay attack, UWB anchors on the vehicle securely measure the distance of the key fob to the vehicle using the time of flight of messages exchanged between the anchors and the key fob. However, continuously waking up the key fob via the LF field and reporting the RSSI value via the wireless link increases the overall power consumption on both the key fob and the vehicle, reducing also the lifetime of the key fob battery.

Now discussed are an entry system with a reduced power consumption, and a corresponding method of operating an entry system, which facilitates a reduction of the power consumption of the system. Furthermore, the presently disclosed entry system and corresponding method facilitate reducing the power consumption of the authentication device with which the entry system communicates.

FIG. 1 shows an illustrative embodiment of an entry system 100. The system 100 comprises a radio frequency (RF) communication unit 102, one or more UWB nodes (i.e., UWB communication nodes) 104, 106, 108 and a processing unit 110. The RF communication unit 102 is configured to transmit a wake-up signal to an external authentication device (not shown). Furthermore, the UWB nodes 104, 106, 108 are configured to operate in a radar mode. More specifically, when operating in the radar mode, the UWB nodes 104, 106, 108 are configured to receive one or more radar signals reflected by an external object (not shown). Furthermore, the processing unit 110 is configured to cause the RF communication unit 102 to transmit the wake-up signal if the UWB nodes 104, 106, 108 receive the radar signals. In this way, the power consumption of the entry system 100 as well as the power consumption of the authentication device may be reduced. In particular, the wake-up signal may only be transmitted if it is likely that the authentication device is in proximity of the entry system. In other words, the detection of an external object by the UWB nodes indicates that it is likely that the authentication device is in proximity. By sending a wake-up signal in a conditional manner unnecessary wake-ups and signal transmissions can be avoided, both on the side of the entry system and on the side of the authentication device. Furthermore, the use of UWB radar signals for the detection of the external object may result in a power-efficient detection method. It is noted that, in a practical implementation, the UWB nodes 104, 106, 108 may not only be able to receive the reflected radar signals (i.e., the radar signals as they are reflected by the external object), but also to transmit said radar signals to the external object.

In particular, UWB nodes may operate in different modes of operation, such as a ranging mode, an angle-of-arrival (AoA) mode and a radar mode. In the ranging mode of operation, frames will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The AoA mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. In the radar mode of operation, frames are transmitted by at least one device and those frames are received by the same device and/or by one or more other devices. Then, the CIRs are estimated on the device or devices receiving the frames, and the range and/or velocity and/or AoA are calculated based on the estimated CIRs. The skilled person will appreciate that these are non-limiting examples of how the different modes of operation can be implemented. In other words, the modes may be implemented differently, depending on the requirements imposed by the application, for example.

In one or more embodiments, the wake-up signal is a broadcasted polling signal. In this way, waking up the external authentication device is facilitated. Furthermore, in one or more embodiments, the processing unit is configured to prevent that the RF communication unit transmits the wake-up signal if the UWB communication nodes do not receive the radar signals. In this way, an unnecessary attempt to wake up an authentication device may be avoided, which in turn facilitates reducing the power consumption. In one or more embodiments, the processing unit is configured to carry out, after the authentication device has woken up, an authentication process with the authentication device through the RF communication unit or through a further communication unit comprised in the system. In this way, the authentication of the authentication device is facilitated. In one or more embodiments, the UWB communication nodes are further configured to operate in a ranging mode, and the processing unit is configured to carry out, before a successful authentication of the authentication device, one or more ranging operations with the authentication device through the UWB communication nodes. In this way, the ranging operations may start as soon as possible, such that processing delays may be reduced. This implementation may be suitable if the first definition of the below-mentioned definitions of a legitimate user is applied. Alternatively, in one or more embodiments, the UWB communication nodes are further configured to operate in a ranging mode, and the processing unit is configured to carry out, after a successful authentication of the authentication device, one or more ranging operations with the authentication device through the UWB communication nodes. In this way, a relay attack on the entry system may easily be detected. This implementation may be suitable if the second definition of the below-mentioned definitions of a legitimate user is applied. In a practical implementation the processing unit is configured to exchange, before carrying out the ranging operations, ranging configuration data with the authentication device through the RF communication unit or through a further communication unit comprised in the system.

In one or more embodiments, the processing unit is further configured to perform a predefined action if the ranging operations output a distance which is smaller than a predefined threshold. In this way, the distance measurement result is used to decide whether the predefined action is performed. The predefined action may be an unlock operation, for example. Thus, a vehicle may be unlocked in dependence on the measured distance, to increase the level of security. In a practical implementation, the RF communication unit is a low frequency (LF) communication unit. In one or more embodiments, the system comprises a further communication unit, wherein the processing unit is configured to receive ranging configuration data through the further communication unit before the wake-up signal is transmitted to the authentication device. In this way, the ranging operation can already be configured before the authentication device is woken up. In a practical implementation, the further communication unit is a Bluetooth low energy (BLE) communication unit. In one or more embodiments, the system further comprises a plurality of antennas coupled to the RF communication unit, and the processing unit is configured to determine respective distances between the external object and the antennas based on the radar signals, and to select a suitable antenna for transmitting the wake-up signal based on the determined distances. In this way, the antenna selection may be facilitated. In a practical implementation, the processing unit is configured to select the antenna having the smallest distance to the external object. In this way, the power required for transmitting the wake-up signal may be minimized.

Figure 2:
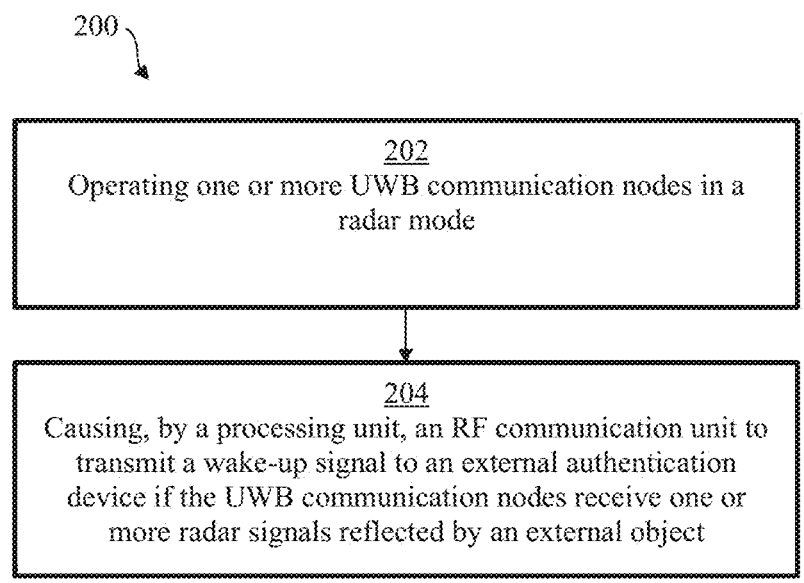
FIG. 2 shows an illustrative embodiment of a method of operating an entry system.

FIG. 2 shows an illustrative embodiment of a method 200 of operating an entry system. The method 200 comprises, at 202, operating one or more UWB communication nodes in a radar mode. Furthermore, the method 200 comprises, at 204, causing, by a processing unit, an RF communication unit to transmit a wake-up signal to an external authentication device if the UWB communication nodes receive one or more radar signals reflected by an external object. As mentioned above, in this way, the power consumption of the entry system as well as the power consumption of the authentication device may be reduced.

In an example of an entry system in accordance with the present disclosure, UWB anchors in a vehicle may be configured to operate in a radar mode and a ranging mode, depending on whether a legitimate vehicle user has been detected in a radar detection zone around the vehicle. Furthermore, a wake-up signal may be broadcasted, for example using a LF magnetic field, only if a potential user has been detected in the radar detection zone.

It is noted that in a typical entry system based on LF and UHF communication, the following operations may be performed. First, a vehicle may broadcast an LF telegram, containing a wake-up identifier (ID), at regular intervals (polling rate). Then, if a fob is within the range of the vehicle given by the fob's sensitivity limit, the fob may sense an LF field, wake up, and check the wake-up ID. Next, if the wake-up ID agrees with the ID stored internally in the fob, then the fob may reply to the vehicle via UHF. Next, the vehicle and the fob may complete the challenge-response authentication, with the vehicle sending the challenge either via LF or via UHF, but the fob always replying via UHF.

When the authentication was successful, the vehicle knows that a legitimate fob is within the communication range. Then the vehicle may send LF telegrams containing a constant carrier, which may be used by the fob to measure the received signal strength indicator (RSSI). Next, the fob may send the RSSI measurements back to the vehicle via UHF. Finally, the vehicle is able to determine the distance based on the RSSI measurements and may then perform various actions in dependence on the determined distance. For example, it may switch on the light in a welcome zone and unlock the vehicle within the aforementioned Thatcham zone. It is noted that in other implementations an authentication may be performed before each RSSI measurement.

Accordingly, a potential user may be defined as a user who is not carrying a fob or a user carrying a fob whose ID is different from the wake-up ID sent by the vehicle. Furthermore, a legitimate user may be defined either as (1) a user carrying a fob whose ID equals the wake-up ID sent by the vehicle or as (2) a user carrying a fob whose ID equals the wake-up ID sent by the vehicle, wherein the fob is also able to complete a challenge-response authentication procedure. The second definition of a legitimate user is stricter and allows to distinguish between truly legitimate users and attackers carrying an illegitimate fob, i.e. a fob that contains a correct wake-up ID but that is unable to complete the challenge response authentication procedure.

Figure 3:
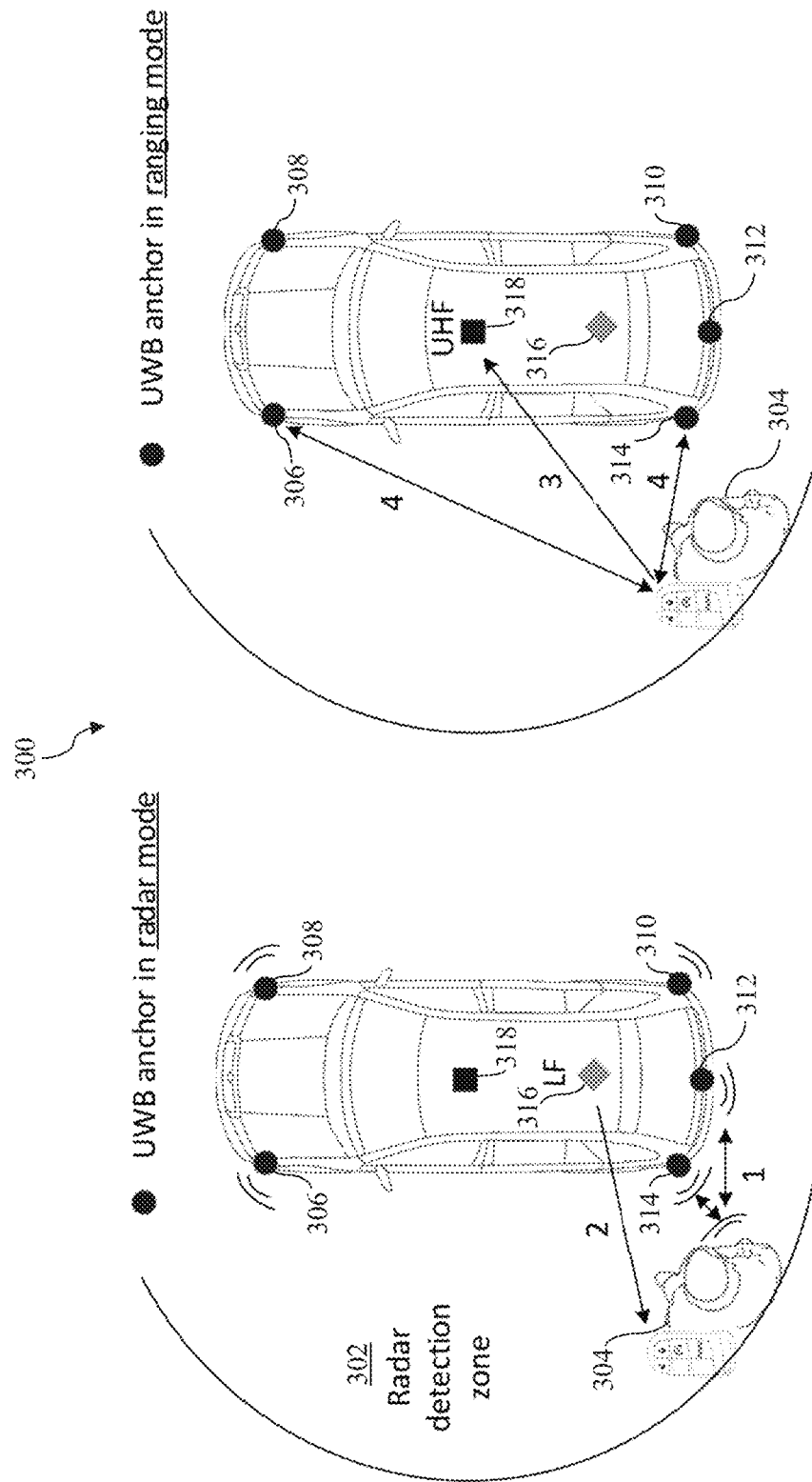
FIG. 3 shows another illustrative embodiment of a method of operating an entry system.

FIG. 3 shows another illustrative embodiment of a method 300 of operating an entry system. It is noted that the steps of the method 300 are referred to with the positive integers 1, 2, 3 and 4. In the first step, a control unit (not shown) configures one or more UWB anchors on the vehicle in radar mode. The control unit may be regarded as a processing unit of the kind set forth. Then, the anchors transmit radar pulses and receive reflections from any moving object in the vehicle's proximity. The control unit determines, based on the received reflections, whether a potential vehicle user is within a radar detection zone around the vehicle. For instance, the detection may be based on the user performing a specific gesture, such as a kicking movement towards a trunk anchor. In the second step, the control unit triggers, on the condition that a potential user has been detected, the LF system to continuously broadcast a polling signal through one or more LF antennas, waking up any key fob in the vehicle's proximity. In the third step, a key fob in the proximity wakes up, completes the authentication (challenge-response procedure) via the UHF link, and then wakes up with each additional poll to respond with RSSI values. Finally, in the fourth step, when the authentication is completed, the control unit configures the UWB anchors in ranging mode and triggers ranging between fob and one or more anchors to determine the distance between fob and vehicle based on the time of flight.

Figure 4:
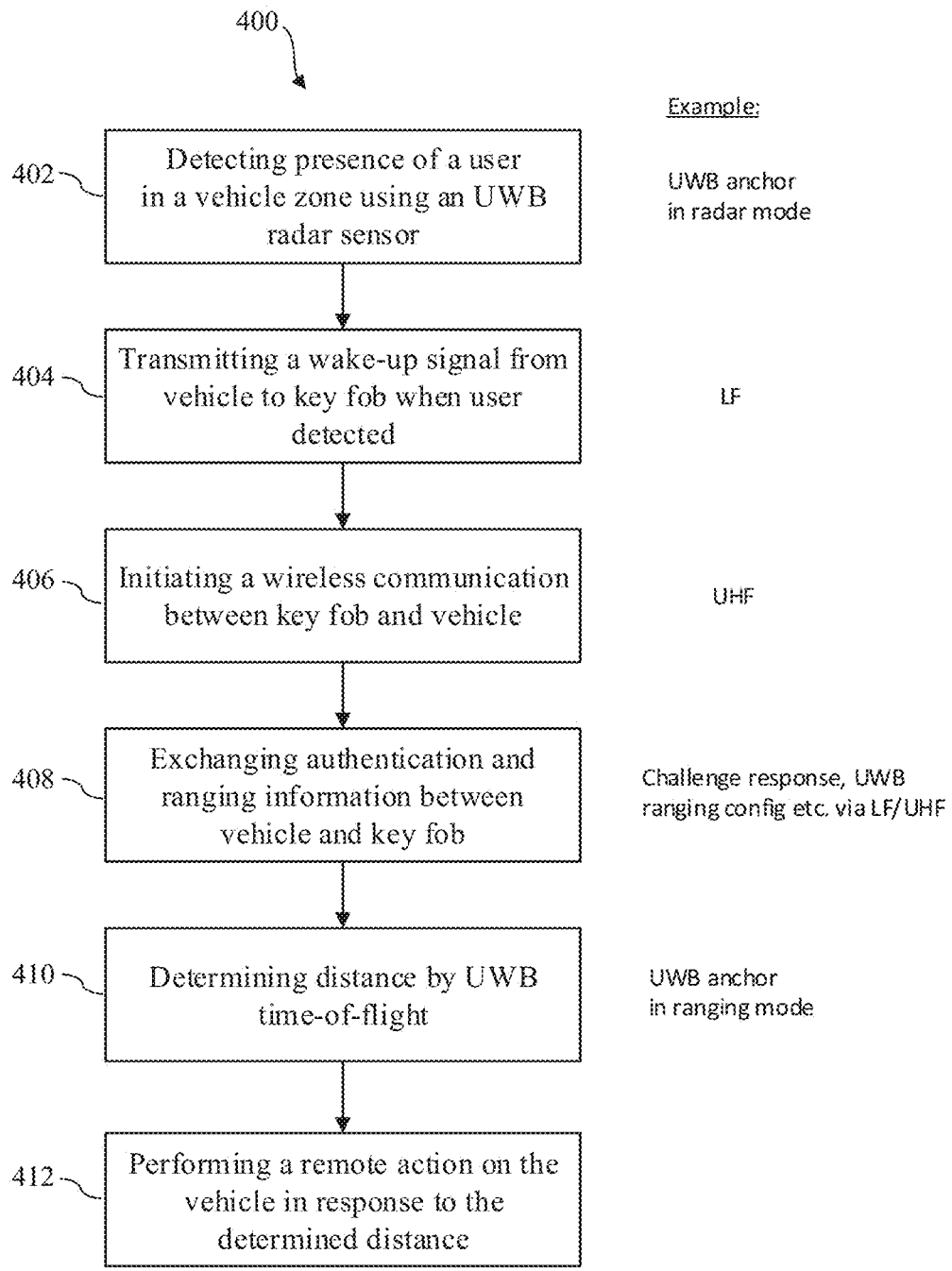
FIG. 4 shows a further illustrative embodiment of a method of operating an entry system.

FIG. 4 shows a further illustrative embodiment of a method 400 of operating an entry system. The method 400 comprises the following steps. At 402, the presence of a user is detected in a vehicle zone using an UWB radar sensor. At 404, a wake-up signal is transmitted from the vehicle to the key fob when the user has been detected. At 406, a wireless communication is initiated between the key fob and the vehicle. Furthermore, at 408, authentication and ranging information is exchanged between the vehicle and the key fob. Furthermore, at 410, the distance between the vehicle and the key fob is determining using a UWB time-of-flight measurement. Finally, at 412, a remote action is performed on the vehicle in response to the determined distance. For instance, in the final step, when a vehicle user has been authenticated and the measured distance is smaller than a threshold (e.g., 2 meters) a remote function is performed on the vehicle side, such as opening a door or a trunk.

It is noted that before the key fob wake-up, the vehicle may already be wirelessly connected with another device carried by the user, such as a smartphone, and UWB ranging round configuration may be exchanged via this wireless connection. This wireless connection may be a Bluetooth low energy (BLE) connection, for example. Furthermore, the backlink from the key fob to the vehicle may be any other wireless connection, for example also a BLE connection. Furthermore, since PKE systems may use multiple LF antennas on the vehicle, the UWB anchors configured in the radar mode may determine the LF antenna that a potential user is closest to, and the control unit may start LF broadcasting only with that antenna, thereby further reducing the power consumption.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 entry system
102 RF communication unit
104 UWB node
106 UWB node
108 UWB node
110 processing unit
200 method of operating an entry system
202 operating one or more UWB communication nodes in a radar mode
204 causing, by a processing unit, an RF communication unit to transmit a wake-up signal to an external authentication device if the UWB communication nodes receive one or more radar signals reflected by an external object
300 method of operating an entry system
302 radar detection zone
304 user carrying an authentication device
306 UWB node
308 UWB node
310 UWB node
312 UWB node
314 UWB node
316 LF communication unit
318 UHF communication unit
400 method of operating an entry system
402 detecting presence of a user in a vehicle zone using an UWB radar sensor
404 transmitting a wake-up signal from vehicle to key fob when user detected
406 initiating a wireless communication between key fob and vehicle
408 exchanging authentication and ranging information between vehicle and key fob
410 determining distance by UWB time-of-flight
412 performing a remote action on the vehicle in response to the determined distance

The invention claimed is:

1. An entry system, comprising:
a radio frequency, RF, communication unit configured to transmit a wake-up signal to an external authentication device;
one or more ultra-wideband, UWB, communication nodes configured to operate in a radar mode, wherein the nodes are configured to receive one or more radar signals reflected by an external object when operating in the radar mode;
a processing unit configured to cause the RF communication unit to transmit the wake-up signal if the UWB communication nodes receive the radar signals;
wherein the processing unit is configured to receive ranging configuration data through the RF communication unit or through a further communication unit comprised in the system before the wake-up signal is transmitted to the authentication device.

2. The system of claim 1, wherein the wake-up signal is a broadcasted polling signal.

3. The system of claim 2, wherein the processing unit is configured to prevent that the RF communication unit transmits the wake-up signal if the UWB communication nodes do not receive the radar signals.

4. The system of claim 2, wherein the processing unit is configured to carry out, after the authentication device has woken up, an authentication process with the authentication device through the RF communication unit or through the further communication unit.

5. The system of claim 1, wherein the processing unit is configured to prevent that the RF communication unit transmits the wake-up signal if the UWB communication nodes do not receive the radar signals.

6. The system of claim 1, wherein the processing unit is configured to carry out, after the authentication device has woken up, an authentication process with the authentication device through the RF communication unit or through the further communication unit.

7. The system of claim 6, wherein the UWB communication nodes are further configured to operate in a ranging mode, and wherein the processing unit is configured to carry out, before a successful authentication of the authentication device, one or more ranging operations with the authentication device through the UWB communication nodes.

8. The system of claim 6, wherein the UWB communication nodes are further configured to operate in a ranging mode, and wherein the processing unit is configured to carry out, after a successful authentication of the authentication device, one or more ranging operations with the authentication device through the UWB communication nodes.

9. The system of claim 7, wherein the processing unit is configured to exchange, before carrying out the ranging operations, ranging configuration data with the authentication device through the RF communication unit or through the further communication unit.

10. The system of claim 7, wherein the processing unit is further configured to perform a predefined action if the ranging operations output a distance which is smaller than a predefined threshold.

11. The system of claim 1, wherein the RF communication unit is a low frequency, LF, communication unit.

12. The system of claim 1, wherein the processing unit is configured to receive ranging configuration data through the further communication unit before the wake-up signal is transmitted to the authentication device.

13. The system of claim 12, wherein the further communication unit is a Bluetooth low energy, BLE, communication unit.

14. The system of claim 1, further comprising a plurality of antennas coupled to the RF communication unit, wherein the processing unit is configured to determine respective distances between the external object and the antennas based on the radar signals, and to select a suitable antenna for transmitting the wake-up signal based on the determined distances.

15. The system of claim 14, wherein the processing unit is configured to select the antenna having the smallest distance to the external object.

16. A method of operating an entry system, comprising:
operating one or more ultra-wideband, UWB, communication nodes in a radar mode;
causing, by a processing unit, a radio frequency, RF, communication unit to transmit a wake-up signal to an external authentication device if the UWB communication nodes receive one or more radar signals reflected by an external object;
receiving, by the processing unit, ranging configuration data prior to transmitting the wake-up signal to the external authentication device.

17. The method of claim 16 wherein the receiving, by the processing unit, ranging configuration data prior to transmitting the wake up signal to the external authentication device includes receiving, by the processing unit, the ranging configuration data through the RF communication unit or through a further communication unit.

* * * * *